(12) United States Patent
Miwa (10) Patent No.: US 11,370,273 B2
(45) Date of Patent: Jun. 28, 2022

(54) INSTRUMENT PANEL STRUCTURE

(71) Applicant: Toyota Jidosha Kabushiki Kaisha, Toyota Aichi-ken (JP)

(72) Inventor: Takahiro Miwa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 102 days.

(21) Appl. No.: 16/700,406

(22) Filed: Dec. 2, 2019

(65) Prior Publication Data

US 2020/0171922 A1 Jun. 4, 2020

(30) Foreign Application Priority Data

Dec. 4, 2018 (JP) .............................. JP2018-227692

(51) Int. Cl.
*B60H 1/34* (2006.01)
*F24F 13/18* (2006.01)

(52) U.S. Cl.
CPC ........... *B60H 1/3428* (2013.01); *F24F 13/18* (2013.01)

(58) Field of Classification Search
CPC ..... B60H 1/3428; F24F 13/18; B62D 25/142; B60K 2370/658
See application file for complete search history.

(56) References Cited

U.S. PATENT DOCUMENTS

| 6,872,134 | B2 * | 3/2005 | Mills ................. B60H 1/00028 454/121 |
| 8,127,798 | B2 * | 3/2012 | Yoskowitz ............... F15D 1/04 138/39 |
| 8,485,153 | B2 * | 7/2013 | Satarino ........... F02M 35/10334 123/184.21 |
| 10,195,923 | B2 * | 2/2019 | Sakurai ................. B60H 1/245 |
| 2016/0121695 | A1 | 5/2016 | Sakurai |

FOREIGN PATENT DOCUMENTS

| JP | H05-032123 A | 2/1993 |
| JP | 2013-139183 A | 7/2013 |
| JP | 2015-016843 A | 1/2015 |
| JP | 2015-020566 A | 2/2015 |
| JP | 2017-149307 A | 8/2017 |
| WO | 01089871 A1 | 11/2001 |

* cited by examiner

*Primary Examiner* — Steven S Anderson, II
*Assistant Examiner* — Phillip Decker
(74) *Attorney, Agent, or Firm* — Dinsmore & Shohl LLP (57) ABSTRACT

Provided is an instrument panel structure including: a lower panel portion that is provided with an air-conditioning device at an interior thereof, the lower panel portion having, in a vehicle upper portion thereof, a placement surface portion that extends in a vehicle width direction and a vehicle front-rear direction, and having an open portion, for the air-conditioning device, that opens toward a side of the placement surface portion; an upper panel portion that covers the placement surface portion as seen from a vehicle upper side and that is placed on the placement surface portion; and a slit-shaped air outlet portion that is formed between the lower panel portion and the upper panel portion, that extends in the vehicle width direction while facing a seat side, and that communicates the open portion with a vehicle cabin.

15 Claims, 9 Drawing Sheets

INSTRUMENT PANEL STRUCTURE

CROSS-REFERENCE TO RELATED APPLICATION

This application is based on and claims priority under 35 USC 119 from Japanese Patent Application No. 2018-227692, filed on Dec. 4, 2018, the disclosure of which is incorporated by reference herein.

BACKGROUND

Technical Field

The present disclosure relates to an instrument panel structure.

Related Art

Japanese Patent Application Laid-open (JP-A) No. 2017-149307 discloses a structure where an air outlet (an opening) for air-conditioned air delivered from an air-conditioning device is formed in an upper surface of an instrument panel of a vehicle.

The air outlet is formed long along the substantially vehicle width direction and has a portion that is curvilinearly curved as seen in a plan view. Because of this, the air-conditioned air can be supplied in multiple directions, and the efficiency of air-conditioning in the entire cabin is improved.

However, in the technology disclosed in JP-A No. 2017-149307, the air outlet is formed in the upper surface of the instrument panel. For this reason, the air-conditioned air becomes supplied toward the front glass, so there is the drawback that the air-conditioned air cannot be effectively supplied to occupants seated in the driver's seat and the front passenger seat. Furthermore, the air outlet is formed in a conspicuous position in the upper surface of the instrument panel, so the visual quality of the instrument panel is diminished.

SUMMARY

In consideration of the above circumstances, it is the present disclosure to obtain an instrument panel structure with which the efficiency of air-conditioning in the cabin can be improved and which is also attractive in design.

An instrument panel structure pertaining to a first aspect of the disclosure includes: a lower panel portion that is provided with an air-conditioning device at an interior thereof, the lower panel portion having, in a vehicle upper portion thereof, a placement surface portion that extends in a vehicle width direction and a vehicle front-rear direction, and having an open portion, for the air-conditioning device, that opens toward a side of the placement surface portion; an upper panel portion that covers the placement surface portion as seen from a vehicle upper side and that is placed on the placement surface portion; and a slit-shaped air outlet portion that is formed between the lower panel portion and the upper panel portion, that extends in the vehicle width direction while facing a seat side, and that communicates the open portion with a vehicle cabin.

The instrument panel structure pertaining to the first aspect of the disclosure is configured to include the lower panel portion, which has in its vehicle upper portion the placement surface portion that extends in the vehicle width direction and the vehicle front and rear direction, and the upper panel portion, which covers the placement surface portion as seen from the vehicle upper side and is placed on the placement surface portion. Furthermore, the slit-shaped air outlet portion that extends in the vehicle width direction facing the seat side is formed between the lower panel portion and the upper panel portion, Here, the lower panel portion is provided with the air-conditioning device inside and has the open portion for the air-conditioning device that opens to the placement surface portion, Additionally, air-conditioned air generated by the air-conditioning device is supplied via the open portion and the air outlet portion to the cabin.

According to this configuration, the air outlet portion is configured to have a shape that extends in the vehicle width direction, so the air-conditioned air can be supplied to a wide area in the vehicle width direction. Furthermore, the air outlet portion faces the seat side, so the air-conditioned air can be effectively supplied to occupants seated in the driver's seat and the front passenger seat, Because of this, the efficiency of air-conditioning in the cabin is improved.

Moreover, the air outlet portion is formed in the shape of a slit between the lower panel portion and the upper panel portion, so it is less conspicuous, Because of this, the design attractiveness of the instrument panel is enhanced.

An instrument panel structure pertaining to a second aspect is the configuration of the first aspect, wherein a side wall portion, which surrounds the open portion and the air outlet portion as seen from a vehicle vertical direction, is provided between opposing surfaces of the placement surface portion and the upper panel portion, and a space that links the open portion and the air outlet portion is formed by the opposing surfaces of the placement surface portion and the upper panel portion and an inner surface of the side wall portion.

In the instrument panel structure pertaining to the second aspect of the disclosure, the side wall portion that surrounds the open portion and the air outlet portion from their outer side in the surface direction as seen from the vehicle up and down direction is provided between the opposing surfaces of the placement surface portion and the upper panel portion. Because of this, the space that interconnects the open portion and the air outlet portion is formed by the opposing surfaces of the placement surface portion and the upper panel portion and the inner surface of the side wall portion. Additionally, the air-conditioned air traveling through the open portion is supplied through the space to the outside of the air outlet portion. Namely, in the instrument panel structure pertaining to the disclosure, the opposing surfaces of the placement surface portion and the upper panel portion and the inner surface of the side wall portion function as a duct that guides the air-conditioned air to the air outlet portion. For this reason, the number of parts disposed between the open portion and the air outlet portion is reduced compared to the conventional structure where plural air outlets are provided in the instrument panel and plural ducts that interconnect the air outlets and the open portion are disposed. Because of this, there is little blow loss of the air-conditioned air.

An instrument panel structure pertaining to a third aspect of the disclosure is the configuration of the second aspect, wherein at least one of the placement surface portion or a lower surface portion of the upper panel portion is provided with a plurality of flow-directing plates at a portion positioned at an inner side of the side wall portion as seen from the vehicle vertical direction.

In the instrument panel structure pertaining to the third aspect of the disclosure, at least one of the placement surface portion and the lower surface portion of the upper panel portion is provided with the plural flow-directing plates on a portion thereof positioned on the inner side of the side wall portion as seen in the vehicle up and down direction. For this reason, it becomes possible to direct, inside the space, the flow of the air-conditioned air traveling through the open portion and efficiently supply the air-conditioned air from the air outlet portion, Because of this, the efficiency of air-conditioning in the cabin can be improved even more.

An instrument panel structure pertaining to a fourth aspect of the disclosure is the configuration of the third aspect, wherein the plurality of flow-directing plates is provided at the placement surface portion and one or more of the plurality of flow-directing plates is formed in a shape of a frame, and the placement surface portion is equipped with a plurality of anchor receiving portions, to which a plurality of anchoring portions provided at a peripheral edge of the upper panel portion can be anchored, and at least, one of the plurality of anchor receiving portions is disposed inside a frame of the plurality of flow-directing plates at a vehicle front side of the air outlet portion.

In the instrument panel structure pertaining to the fourth aspect of the disclosure, the plural anchoring portions are provided on the peripheral edge of the upper panel portion, and the anchoring portions correspond to the plural anchor receiving portions provided in the placement surface portion of the lower panel portion. Furthermore, the flow-directing plates are provided on the placement surface portion and at least part of them is formed in the shape of a frame. Here, in the placement surface portion, at least one anchor receiving portion disposed on the vehicle front side of the air outlet portion is disposed inside the frames of the flow-directing plates. Because of this, the lower panel portion and the upper panel portion can be anchored to each other in the neighborhood of the air outlet portion, and rattling can be inhibited from occurring in the air outlet portion of the instrument panel. Moreover, the anchor receiving portions are disposed inside the frames of the flow-directing plates, so a situation where the directing of the flow of the air-conditioned air is obstructed by the anchoring portions and the anchor receiving portions is inhibited. Because of this, it becomes possible to well maintain the supply of the air-conditioned air from the air outlet portion.

An instrument panel structure pertaining to a fifth aspect of the disclosure is the configuration of any one of the first aspect, to the fourth aspect, wherein the upper panel portion is detachable from the placement surface portion.

In the instrument panel structure pertaining to the fifth aspect of the disclosure, the upper panel portion is configured to be detachable from the placement surface portion, so the entire placement surface portion becomes exposed by detaching the upper panel portion. For this reason, maintenance of the placement surface portion and the air-conditioning device can be easily performed.

An instrument panel structure pertaining to a sixth aspect of the disclosure is the configuration of any one of the first aspect to the fifth aspect, wherein in the placement surface portion, an air direction guide portion, which extends in a vehicle rearward direction and a vehicle upward direction as seen from the vehicle width direction, is formed at a seat-side peripheral edge of the placement surface portion and at a vehicle rear side of the air outlet portion.

In the instrumental panel structure pertaining to the sixth aspect of the disclosure, the air direction guide portion that extends in the vehicle rearward direction and the vehicle upward direction as seen from the vehicle width direction is formed on the seat-side peripheral edge of the placement surface portion and on the vehicle rear side of the air outlet portion. For this reason, the air-conditioned air traveling through the air outlet portion is guided by the air direction guide portion and supplied in the vehicle rearward direction and the vehicle upward direction. Because of this, the air-conditioned air is effectively supplied to the upper bodies of occupants seated in the driver's seat and the front passenger seat, and the apparent temperature experienced by the occupants can be efficiently adjusted.

According to the instrument panel structure of the first aspect of the disclosure, the instrument panel structure has the effect that the efficiency of air-conditioning in the cabin can be improved and the design attractiveness of the instrument panel can be enhanced.

According to the instrument panel structure of the second aspect of the disclosure, the instrument panel structure has the effect that the number of parts disposed between the open portion and the air outlet portion corresponding to the air-conditioning device can be reduced so that reduce blow loss of the air-conditioned air can be reduced.

According to the instrument panel structure of the third aspect of the disclosure, the instrument panel structure has the effect that the air-conditioned air from the air outlet portion can be efficiently supplied and the efficiency of air-conditioning in the cabin can be improved even more.

According to the instrument panel structure of the fourth aspect of the disclosure, the instrument panel structure has the effect that the supply of the air-conditioned air from the air outlet portion can be well maintained while inhibiting rattling from occurring in the air outlet portion of the instrument panel.

According to the instrument panel structure of the fifth aspect of the disclosure, the instrument panel structure has the effect that maintenance of the placement surface portion and the air-conditioning device can be easily performed.

According to the instrument panel structure of the sixth aspect of the disclosure, the instrument panel structure has the effect that the air-conditioned air can be effectively supplied to the upper bodies of occupants seated in the driver's seat and the front passenger seat and the apparent temperature experienced by the occupants can be efficiently adjusted.

BRIEF DESCRIPTION OF THE DRAWINGS

Exemplary embodiments of the present disclosure will be described in detail based on the following figures, wherein.

DETAILED DESCRIPTION

First Embodiment

An instrument panel 10 to which an instrument panel structure pertaining to the present embodiment has been applied will be described below using FIG. 1 to FIG. 5. Arrow FR appropriately shown in the drawings indicates a vehicle forward direction, arrow UP indicates a vehicle upward direction, and arrow OUT indicates a vehicle outward direction. Furthermore, when the directions of front/rear, upper/lower, and right/left are used without further specification in the following description, these will be understood to mean front/rear in the vehicle front and rear direction, upper/lower in the vehicle up and down direction, and right/left when facing the direction of forward travel.

Figure 1:
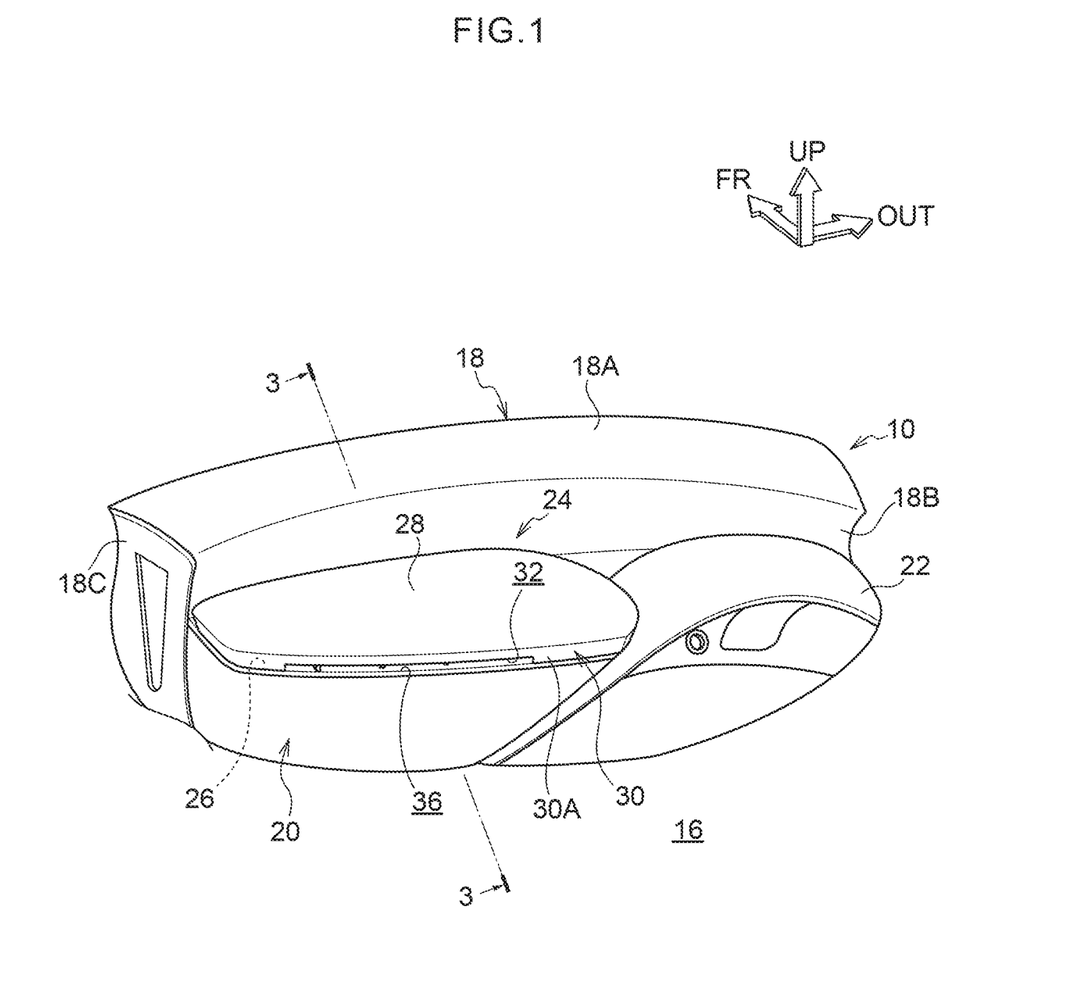
FIG. 1 is a perspective view of an instrument panel to which an instrument panel structure pertaining to a first embodiment has been applied and shows a state in which an upper panel portion has been placed on a lower panel portion.
Figure 2:
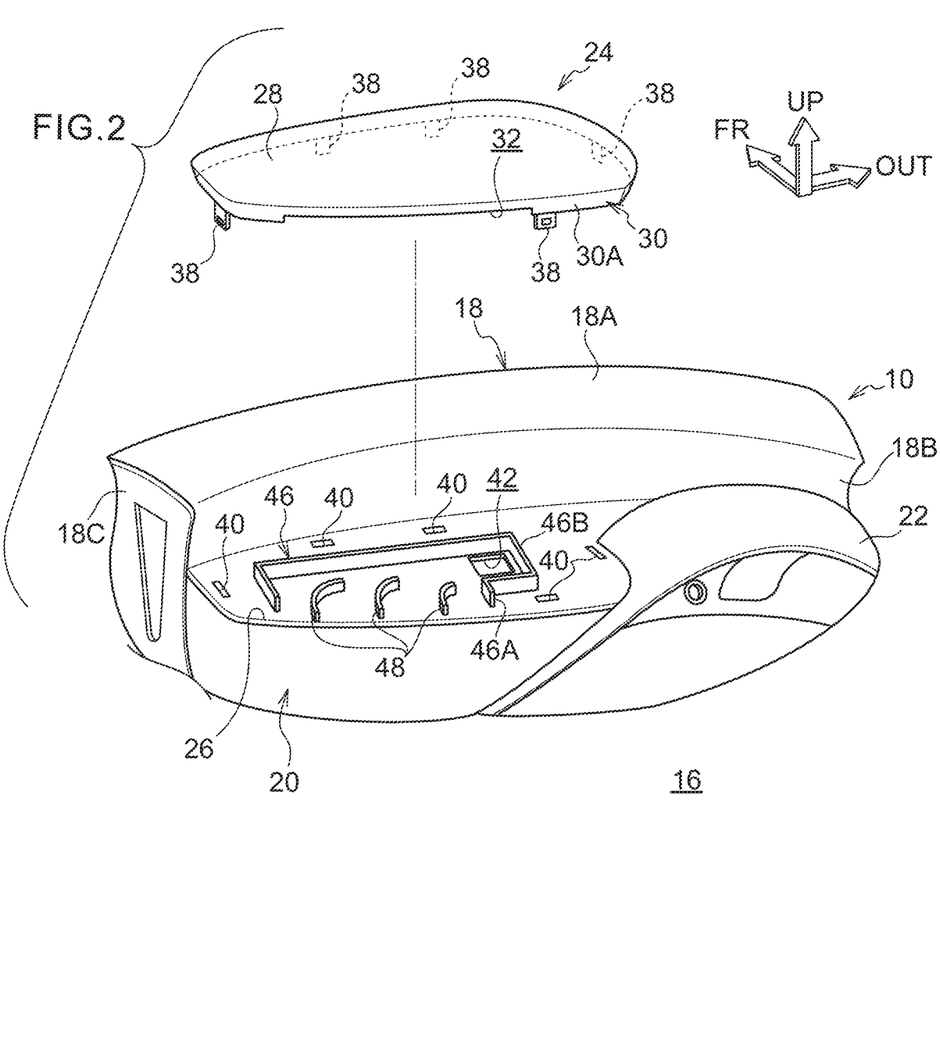
FIG. 2 is a perspective view of the instrument panel shown in FIG. 1 and shows a state in which the upper panel portion has been detached from the lower panel portion.
Figure 3:
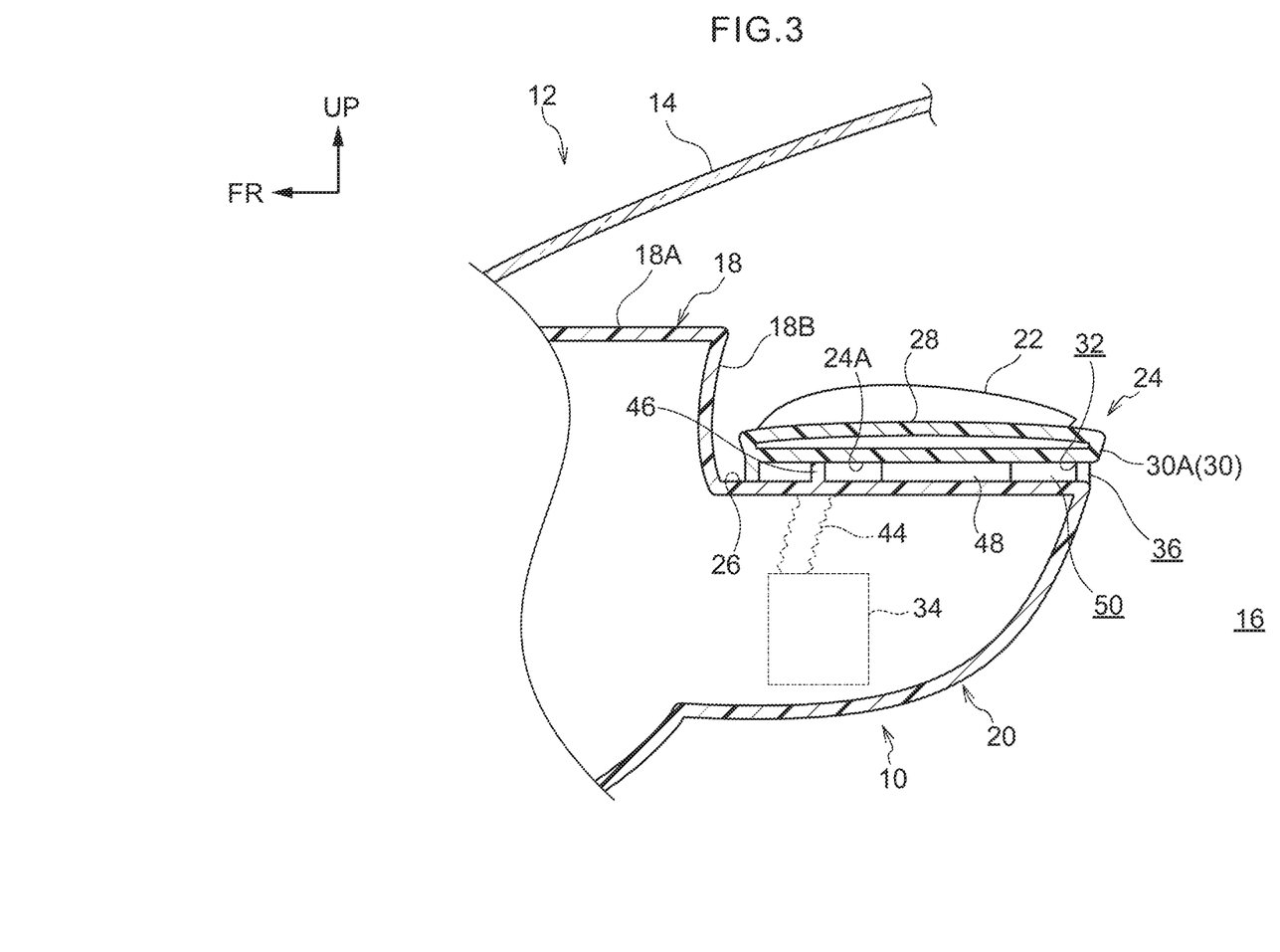
FIG. 3 is a sectional view along line 3-3 of FIG. 1.

As shown in FIG. 1 to FIG. 3, the instrument panel 10 is disposed on the vehicle up and down direction lower side of a front glass 14 of a vehicle 12 (see FIG. 3) and extends along the vehicle width direction. The instrument panel 10 is a panel structure configured by a resin material, is disposed with on-board instruments such as meters, audio devices, and an airbag inside, and configures a design surface of a front portion of a cabin 16 of the vehicle 12. Furthermore, although it is not shown in the drawings, the instrument panel 10 is attached to a substantially cylindrical instrument panel reinforcement (not shown in the drawings) that bridges front pillars (not shown in the drawings) provided on both vehicle width direction sides.

The instrument panel 10 is equipped with a main body portion 18 that configures the vehicle front and rear direction front portion of the instrument panel 10, a lower panel portion 20 that is disposed on the vehicle rear side of the main body portion 18, a column cover portion 22 that is disposed on the vehicle upper side and the vehicle width direction right side of the lower panel portion 20, and an upper panel portion 24 that is disposed adjacent to the vehicle width direction left side of the column cover portion 22. In FIG. 1 and FIG. 2 illustration of the front glass 14 is omitted.

The main body portion 18 is formed in the shape of a shelf by an upper surface portion 18A that extends in the vehicle width direction and has a long rectangular shape as seen in a plan view, a vertical wall portion 18B that extends downward from the vehicle front and rear direction rear end portion of the upper surface portion 18A, and side portions 18C that extend in the vehicle downward direction from both vehicle width direction end portions of the upper surface portion 18A. Although it is not shown in the drawings, plural open portions are formed in the upper surface portion 18A and the vertical wall portion 18B, and the open portions are configured to serve as light projection openings for ahead-up display installed in the vehicle and as mounting openings of bezels corresponding to display portions of the various meters.

The lower panel portion 20 is provided on the vehicle lower side of the vertical wall portion 18B. The lower panel portion 20 is configured to have a shape that projects like a table in the vehicle rearward direction from the lower end of the vertical wall portion 18B, and the vehicle upper portion of the lower panel portion 20 is configured to serve as a placement surface portion 26 that extends in the vehicle width direction and the vehicle front and rear direction. FIG. 2 and FIG. 3 show part of the placement surface portion 26 disposed on the front side of a front passenger seat of the vehicle 12.

The column cover portion 22 is placed on the vehicle width direction right-side portion of the placement surface portion 26 (on the front side of a driver's seat). The column cover portion 22 is formed in the shape of a dome that is convex in the vehicle upward direction, and the column cover portion 22 covers a steering column (not shown in the drawings) from the vehicle upper side. As an example, the column cover portion 22 is anchored to the placement surface portion 26 using clips or the like.

The upper panel portion 24 is placed on a portion of the placement surface portion 26 ranging from the vehicle width direction center to the left side (the front side of the front passenger seat). The upper panel portion 24 is formed as a flat cover by a flat plate portion 28, which is formed in a substantially elliptical shape as seen in a plan view and extends in the vehicle width direction and the vehicle front and rear direction, and a wall portion 30, which extends in the vehicle downward direction from the peripheral edge of the flat plate portion 28. Furthermore, a groove-like cutout portion 32 that opens in the vehicle downward direction is provided in a side surface 30A of the wall portion 30 that faces the seat side, and the cutout portion 32 is formed substantially all the way along the side surface 30A in the vehicle width direction. In a state in which the upper panel portion 24 has been placed on the placement surface portion 26, the peripheral edge portion of the upper panel portion 24 that faces the seat side is disposed along the peripheral edge portion of the placement surface portion 26 that faces the seat side as seen in a plan view. Because of this, a slit-shaped gap that extends in the vehicle width direction is formed, by the cutout portion 32, in the side surface of the lower panel portion 20 and the upper panel portion 24 that faces the seat side. The gap is configured to serve as an air outlet portion 36 for air-conditioned air delivered from an air-conditioning device 34 described later. Because of this configuration, the air outlet portion 36 is provided facing the front passenger seat (not shown in the drawings) on the vehicle width direction left side from the vehicle width direction substantial center of the vehicle 12.

Furthermore, as shown in FIG. 2, plural clips 38 that extend in the vehicle downward direction from the lower end portion of the wall portion 30 are integrally formed on the upper panel portion 24, The clips 38 correspond to plural clip seats 40 (described later) provided in the placement surface portion 26. The details of the clips 38 will be described later.

Figure 4:
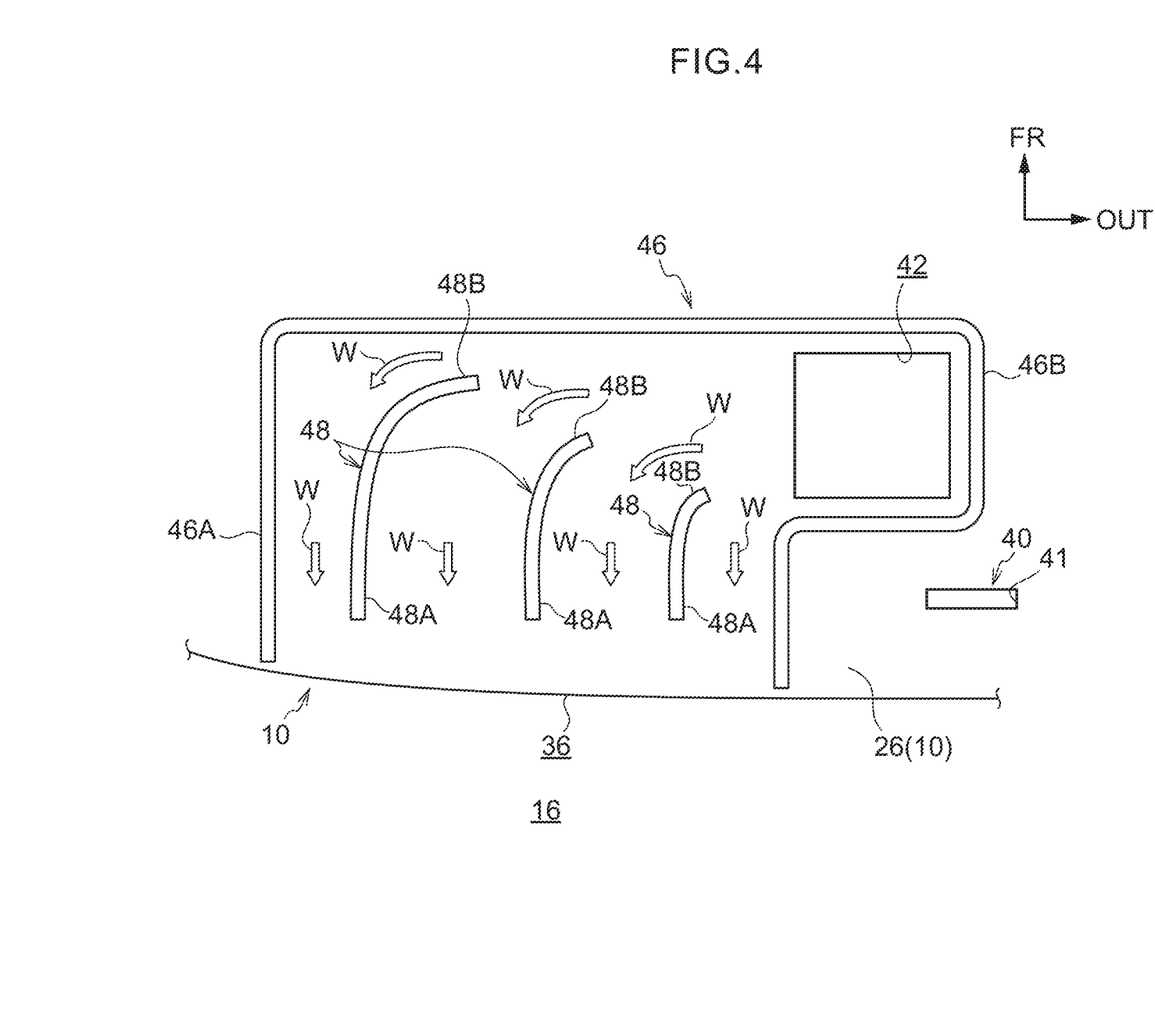
FIG. 4 is a partial plan view showing a placement surface portion pertaining to the first embodiment.

As shown in FIG. 2 and FIG. 4, on the vehicle lower side of the upper panel portion 24 having the configuration described above, an open portion 42 that is substantially rectangular in shape as seen in a plan view is formed in the placement surface portion 26. The open portion 42 is provided in a position on the vehicle front side of the air outlet portion 36 and adjacent to the right side of the air outlet portion 36 as seen in a plan view. In other words, the open portion 42 is formed in a position in which it does not coincide with the air outlet portion 36 when seen from the vehicle front and rear direction. The open portion 42 is connected via a tubular duct 44 to a blow port (not assigned a reference sign) of the air-conditioning device 34 disposed inside the lower panel portion 20 (see FIG. 3). In the present embodiment the air-conditioning device 34 is an on-vehicle heating, ventilation, and air-conditioning (HVAC) device.

Furthermore, a side wall portion 46 that surrounds the open portion 42 and the air outlet portion 36 as seen in a plan view (as seen from the vehicle up and down direction) is provided between opposing surfaces of the placement surface portion 26 and the upper panel portion 24, that is, between the placement surface portion 26 and a lower surface portion 24A of the upper panel portion 24. Specifically, the side wall portion 46 is integrally formed on the placement surface portion 26 and is provided erectly upward in the vehicle up and down direction. The side wall portion 46 has the shape of a frame in which is formed an open end corresponding to the air outlet portion 36 as seen in a plan view. Specifically, the side wall portion 46 is equipped with linear flow path portions 46A, which extend substantially parallel to each other in the forward direction along the vehicle front and rear direction from both sides of the air outlet portion 36, and a delivery portion 46B, which is substantially U-shaped and is formed continuously with the vehicle front and, rear direction front end portions of the linear flow path portions 46A and projects rightward in the vehicle width direction with respect to the linear flow path portions 46A, Furthermore, the open portion 42 is disposed inside the substantially U-shaped delivery portion 46B. In this way, the side wall portion 46 is erectly provided so as to surround the open portion 42 and the air outlet portion 36 from their outer side in the surface direction of the placement surface portion 26.

Furthermore, the upper end of the side wall portion 46 abuts against the lower surface portion 24A of the upper panel portion 24 in a state in which the upper panel portion 24 has been placed on the placement surface portion 26. Consequently, in this state, a space 50 is formed by the placement surface portion 26, the lower surface portion 24A of the upper panel portion 24, and the side wall portion 46, and the space 50 serves as an air-conditioned air flow path that interconnects the open portion 42 and the air outlet portion 36. In other words, the placement surface portion 26, the lower surface portion 24A of the upper panel portion 24, and the side wall portion 46 fulfill the role of a duct to supply the air-conditioned air delivered from the open portion 42 to the air outlet portion 36.

Furthermore, as shown in FIG. 4, plural (in the present embodiment, three) flow-directing plates 48 are integrally formed on the placement surface portion 26 on the inner side of the linear flow path portions 46A of the side wall portion 46. The flow-directing plates 48 are configured by ribs provided erectly upward in the vehicle up and down direction from the placement surface portion 26 and are disposed a predetermined distance apart from each other along the vehicle width direction. As seen in a plan view, each flow-directing plate 48 is equipped with a linear portion 48A, which extends in the vehicle front and rear direction along the linear flow path portions 46A, and a curved portion 48B, which, curves from the vehicle front end portion of the linear portion 46A toward the open portion 42 located on the vehicle width direction right side. Because of this, the air-conditioned air delivered from the open portion 42 is supplied to the linear flow path portions 46A of the side wall portion 46, changes direction in accordance with the curved portions 48B of the flow-directing plates 48, and is supplied along the linear portions 48A from the air outlet portion 36 to the cabin 16. In this way, the efficiency with which the air-conditioned air flows between the open portion 42 and the air outlet portion 36 is improved. In FIG. 4 the flow paths of the air-conditioned air are conceptually indicated by arrows W.

Moreover, the plural flow-directing plates 48 are set in such a way that the vehicle front and rear direction dimension of the linear portions 48A increases the greater the distance is in the vehicle width direction between the open portion 42 and the positions where the flow-directing plates 48 are disposed, which inhibits wraparound of the air-conditioned air from occurring in positions distant from the open portion 42.

Furthermore, as shown in FIG. 2, in the placement surface portion 26 having the above configuration, plural (in the present embodiment, five) clip seats 40 corresponding to the clips 38 are provided around the side wall portion 46. Specifically, the plural clip seats 40 are provided on both vehicle width direction sides of the side wall portion 46 and on the vehicle front side of the side wall portion 46. Each clip 38 is equipped with a tabular base portion 39 that extends in the vehicle downward direction from the lower surface portion 24A of the upper panel portion 24 (see FIG. 7). An anchoring tab 39A that projects from the base portion 39 and is elastically deformable is provided on one side of the base portion 39 in the vehicle front and rear direction. Furthermore, the distal end portion of the base portion 39 is configured to serve as a tapered guide portion 39B. Furthermore, a stopper portion 39C that projects from the base portion 39 is formed on the upper end portion of the base portion 39. The stopper portion 39C is formed on the side of the base portion 39 located on the opposite side of the side where the anchoring tab 39A is formed. The clips 38 are inserted, from the guide portions 39B, into insertion openings 41 of the clip seats 40 and can pass through the insertion openings 41 by elastically deforming the anchoring tabs 39A. Furthermore, when the clips 38 are inserted to a predetermined position, the anchoring tabs 39A elastically return and become anchored to the insertion openings 41. The stopper portions 39C abut against the peripheral edge portions of the insertion openings 41, whereby movement of the clips 38 in the vehicle downward direction is regulated. This configuration allows the lower panel portion 20 and the upper panel portion 24 to be anchored to each other. Furthermore, the upper panel portion 24 is configured to be detachable from the lower panel portion 20 by disengaging the anchoring tabs 39A from the insertion openings 41. The clips 38 correspond to "anchoring portions" of the disclosure, and the clip seats 40 correspond to "anchor receiving portions" of the disclosure.

(Action and Effects)

Next, the action and effects of the present embodiment will be described.

The instrument panel 10 is configured to include the lower panel portion 20, which has in its vehicle upper portion the placement surface portion 26 that extends in the vehicle width direction and the vehicle front and rear direction, and the upper panel portion 24, which covers the placement surface portion 26 as seen from the vehicle upper side and is placed on the placement surface portion 26, Furthermore, the slit-shaped air outlet portion 36 that extends in the vehicle width direction facing the seat side is formed between the lower panel portion 20 and the upper panel portion 24, Specifically, the air outlet portion 36 is provided facing the front passenger seat (not shown in the drawings) located on the vehicle width direction left side from the vehicle width direction substantial center of the vehicle 12. Here, the lower panel portion 20 is provided with the air-conditioning device 34 inside and has the open portion 42 for the air-conditioning device 34 that opens to the placement surface portion 26. Additionally, the air-conditioned air generated by the air-conditioning device 34 is supplied via the open portion 42 and the air outlet portion 36 to the cabin 16.

According to this configuration, the air outlet portion 36 is configured to have a shape that extends in the vehicle width direction, so the air-conditioned air can be supplied to a wide area in the vehicle width direction. Furthermore, the air outlet portion 36 faces the seat side, so the air-conditioned air can be effectively supplied to occupants seated in the driver's seat and the front passenger seat. Because of this, the efficiency of air-conditioning in the cabin 16 is improved.

Moreover, the air outlet portion 36 is formed in the shape of a slit between the lower panel portion 20 and the upper panel portion 24, so it is less conspicuous. Because of this, the design attractiveness of the instrument panel 10 is enhanced.

Furthermore, in the present embodiment, the side wall portion 46 is provided between the opposing surfaces of the placement surface portion 26 and the upper panel portion 24. Specifically, the side wall portion 46 is erectly provided along the vehicle up and down direction on the placement surface portion 26 and is provided so as to surround the open portion 42 and the air outlet portion 36 from their outer side as seen from the vehicle up and down direction, Because of this, the space 50 that interconnects the open portion 42 and the air outlet portion 36 is formed by the opposing surfaces of the placement surface portion 26 and the upper panel portion 24 and the inner surface of the side wall portion 46. Additionally, the air-conditioned air traveling through the open portion 42 is supplied through the space 50 to the outside of the air outlet portion 36.

Namely, in the instrument panel 10 pertaining to the present embodiment, the placement surface portion 26, the upper panel portion 24, and the side wall portion 46 function as a duct that guides the air-conditioned air to the air outlet portion 36. For this reason, the number of parts disposed between the open portion and the air outlet portion is reduced compared to the conventional structure where plural air outlets are provided in the instrument panel and plural ducts that interconnect the air outlet portions and the open portion are disposed. Because of this, there is little blow loss of the air-conditioned air.

Furthermore, in the present embodiment, the placement surface portion 26 is provided with the plural flow-directing plates 48 on the portion thereof positioned on the inner side of the side wall portion 46 as seen in the vehicle up and down direction. For this reason, it becomes possible to direct, inside the space 50, the flow of the air-conditioned air traveling through the open portion 42 and efficiently supply the air-conditioned air from the air outlet portion 36. Because of this, the efficiency of air-conditioning in the cabin 16 can be improved even more.

Furthermore, in the present embodiment, the upper panel portion 24 is configured to be detachable from the placement surface portion 26 by disengaging the clips 38 from the clip seats 40. For this reason, by detaching the upper panel portion 24, maintenance of the placement surface portion 26 and the air-conditioning device 34 can be easily performed.

Second Embodiment

Next, an instrument panel 60 pertaining to a second embodiment will be described on the basis of FIG. 6 and FIG. 7. Constituent parts that are the same as those of the first embodiment are assigned the same numbers, and description thereof will be omitted. The instrument panel 60 pertaining to the second embodiment is characterized in that clip seats 40 are provided inside flow-directing plates 64.

As shown in these drawings, plural (in the present embodiment, three) flow-directing plates 48, 64 are integrally formed on a placement surface portion 62 on the inner side of the linear flow path portions 46A of the side wall portion 46. In the present embodiment, one flow-directing plate 48 is disposed in the center in the vehicle width direction, and one flow-directing plate 64 each is disposed on both right and left sides of the flow-directing plate 48, The configuration of the flow-directing plate 48 is the same as in the first embodiment, so description thereof will be omitted.

The flow-directing plates 64 basically follow the flow-directing plates 48 of the first embodiment; as seen in a plan view; each flow-directing plate 64 is equipped with a linear portion 64A, which extends in the vehicle front and rear direction along the linear flow path portion 46A, and a curved portion 64B, which curves from the vehicle front end portion of the linear portion 64A toward the open portion 42 located on the vehicle width direction right side. The flow-directing plates 64 differ from the flow-directing plate 48 in that a frame portion 64C having the shape of a frame as seen in a plan view is provided on part of the flow-directing plate 64, Specifically, a frame portion 64C substantially in the shape of a rectangular frame as seen in a plan view is provided on the vehicle front and rear direction rear end portion of the linear portion 64A of each flow-directing plate 64. Clip seats 40 are provided inside the frame portions 64C, Furthermore, in correspondence to the clip seats 40, plural (in the present embodiment, two) clips 38 are provided on the peripheral edge of the upper panel portion 24 that faces the seat side.

(Action and Effects)

The instrument panel 60 having the above configuration basically follows the configuration of the instrumental panel 10 pertaining to the first embodiment, so the same action and effects can be obtained.

Furthermore, in the present embodiment, the frame portions 64C of the flow-directing plates 64 are formed in the shape of a frame as seen in a plan view, and the clip seats 40 are provided inside the frame portions 64C. For this reason, the lower panel portion 20 and the upper panel portion 24 can be anchored to each other in the neighborhood of the air outlet portion 36 by the clip seats 40 disposed on the vehicle front side of the air outlet portion 36. Because of this, rattling can be inhibited from occurring in the air outlet portion 36 in the placement surface portion 62.

Moreover, the clip seats 40 are disposed inside the frame portions 64C of the flow-directing plates 64, so a situation where the directing of the flow of the air-conditioned air is obstructed by the clips 38 and the clip seats 40 can be inhibited, Because of this, the supply of the air-conditioned air from the air outlet portion 36 can be well maintained.

Example Modification

Figure 6:
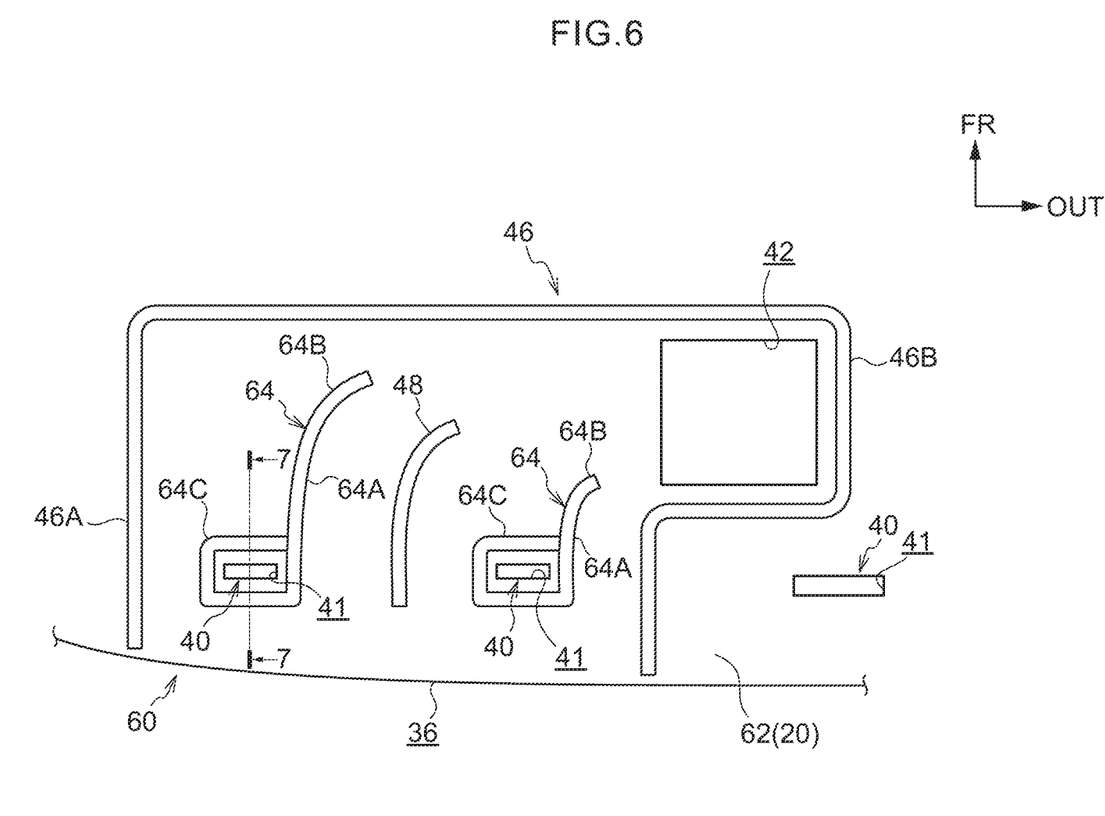
FIG. 6 is a partial plan view, corresponding to FIG. 4, showing a placement surface portion pertaining to a second embodiment.
Figure 7:
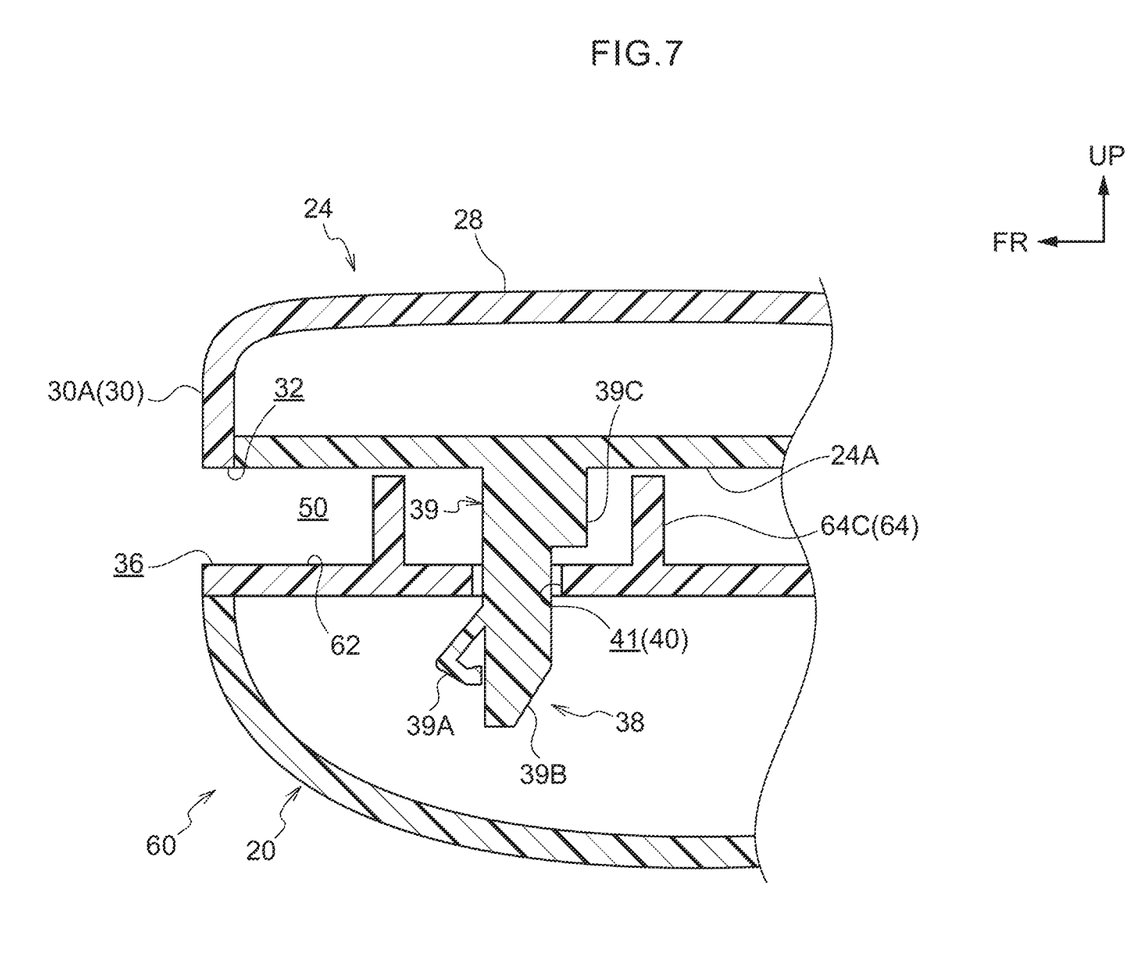
FIG. 7 is a sectional view along line 7-7 of FIG. 6.
Figure 8:
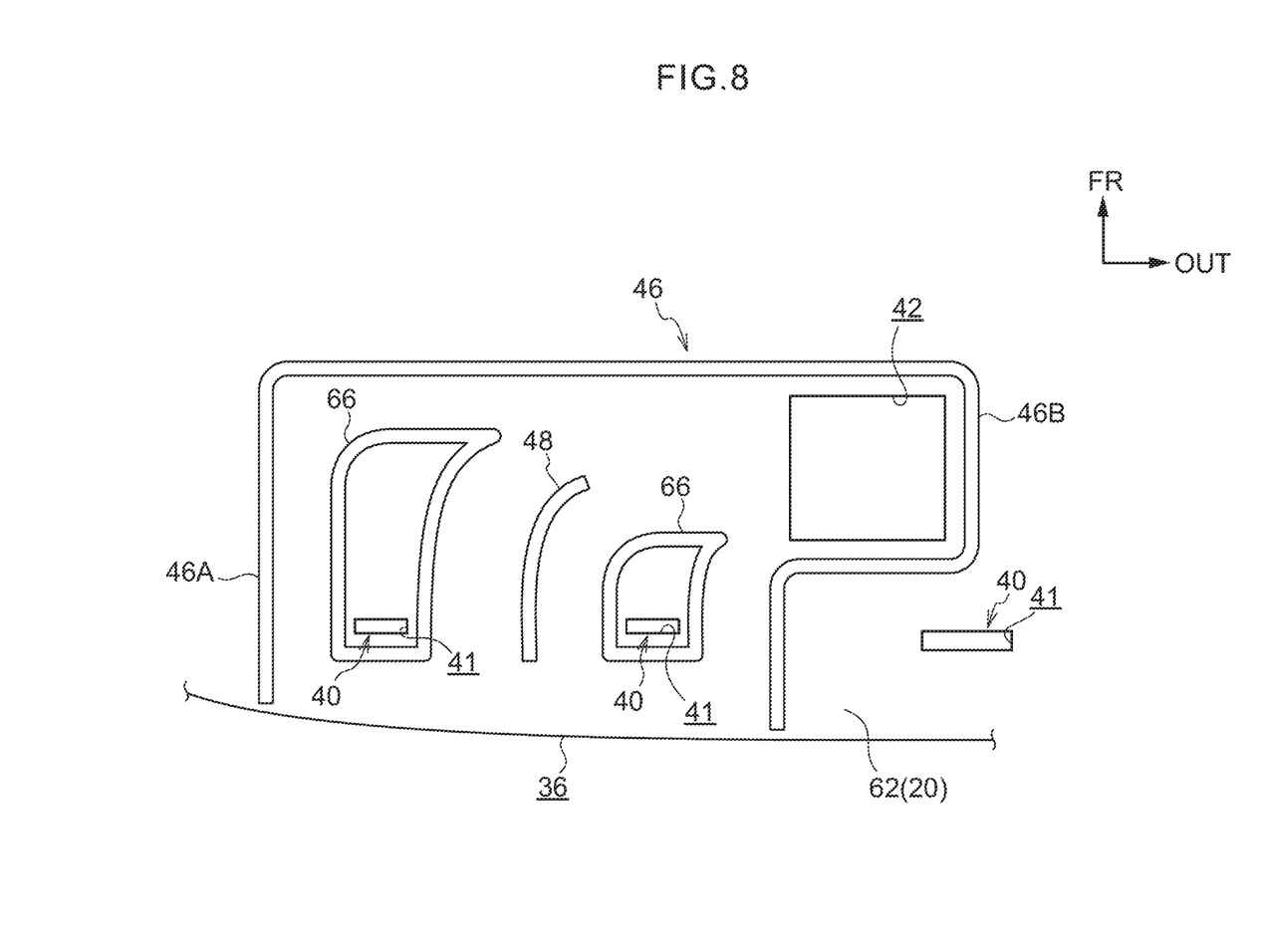
FIG. 8 is a partial plan view, corresponding to FIG. 4, showing an example modification of the placement surface portion pertaining to the second embodiment.

In the present embodiment, as shown in FIG. 6, the vehicle front and rear direction rear end portions of the linear portions 64A of the flow-directing plates 64 are configured to serve as the frame portions 64C substantially in the shapes of rectangular frames as seen in a plan view. However, the instrument panel is not limited to this and may also have a configuration where, as shown in FIG. 8, flow-directing plates 66 are each entirely formed in the shape of a frame as seen in a plan view, with the clip seats 40 being provided inside the frames. By entirely forming each flow-directing plate 66 in the shape of a frame, the directing of the flow of the air-conditioned air is inhibited even more from being disrupted by the clip seats 40. Because of this, the supply of the air-conditioned air from the air outlet portion 36 can be better maintained.

Third Embodiment

Next, an instrument panel 70 pertaining to a third embodiment will be described on the basis of FIG. 9. Constituent parts that are the same as those in the first embodiment are assigned the same numbers, and description thereof will be omitted. The instrument panel 70 pertaining to the third embodiment is characterized in that, in a lower panel portion 72, an air direction guide portion 76 that extends in the vehicle rearward direction and the vehicle upward direction as seen from the vehicle width direction is formed on the seat-side peripheral edge of the placement surface portion 26 and on the vehicle rear side of the air outlet portion 36.

Figure 9:
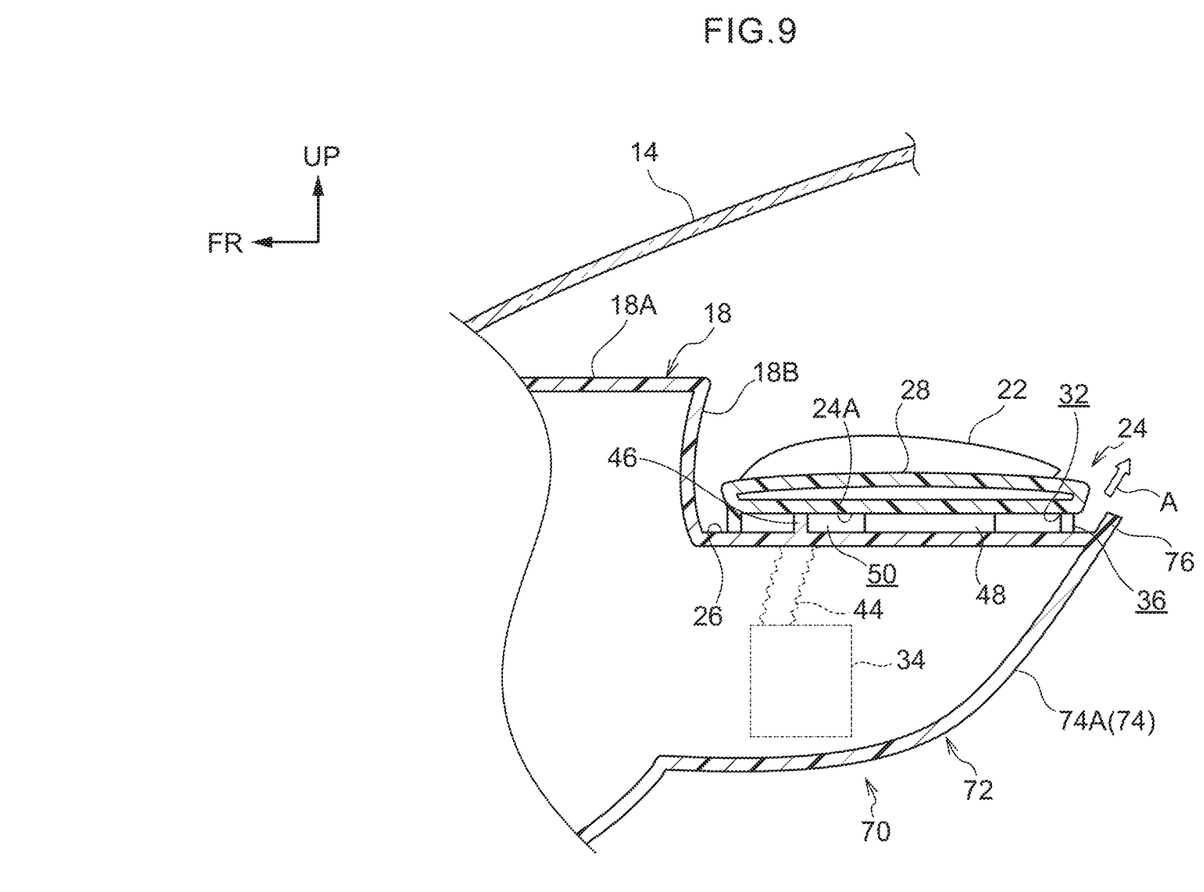
FIG. 9 is a sectional view, corresponding, to FIG. 3, showing an instrument panel structure pertaining to a third embodiment.

As shown in FIG. 9, the air direction guide portion 76 is formed in a side surface 74A, which faces the seat side, of a lower portion 74 that configures the vehicle lower portion of the lower panel portion 20. Specifically, the air direction guide portion 76 is configured by forming the upper end portion, which faces the seat side, of the lower portion 74 so as to project more in the vehicle rearward direction than the air outlet portion 36 and extending the upper end portion of the lower portion 74 in the vehicle rearward direction and the vehicle upward, direction as seen from the vehicle width direction. Because of this, the air-conditioned air delivered in the vehicle rearward direction from the air outlet portion 36 is guided by the air direction guide portion 76 and delivered obliquely upward in the vehicle rearward direction (see arrow A shown in FIG. 9), (Action and Effects)

Next, the action and effects of the present embodiment will be described. The instrument panel 70 pertaining to the third embodiment also basically follows the configuration of the instrument panel 10 pertaining to the first embodiment, so the same action and effects can be obtained.

Furthermore, in the present embodiment, the air direction guide portion 76 that extends in the vehicle rearward direction and the vehicle upward direction as seen from the vehicle width direction is formed on the seat-side peripheral edge of the placement surface portion 26 and on the vehicle rear side of the air outlet portion 36. For this reason, the air-conditioned air traveling through the air outlet portion 36 is guided by the air direction guide portion 76 and supplied in the vehicle rearward direction and the vehicle upward direction. Because of this, the air-conditioned air is effectively supplied to the upper bodies of occupants seated in the driver's seat and the front passenger seat, and the apparent temperature experienced by the occupants can be efficiently adjusted.

[Supplemental Description]

In the first embodiment to the third embodiment, the air outlet portion 36 is provided by forming the cutout portion 32 in the upper panel portion 24, but the air outlet portion may also be provided by forming in the lower panel portion 20 a groove-like cutout portion that opens in the vehicle upward direction. As another method, cutout portions with symmetrical shapes in the vehicle up and down direction may be formed in both the lower panel portion 20 and the upper panel portion 24, and the air outlet portion may be provided by both cutout portions.

Furthermore, in the first embodiment, the side wall portion 46 is integrally formed on the placement surface portion 26 of the lower panel portion 20, but the disclosure is, not limited to this, and the side wall portion 46 may also be integrally formed on the lower surface portion 24A of the upper panel portion 24.

Figure 5:
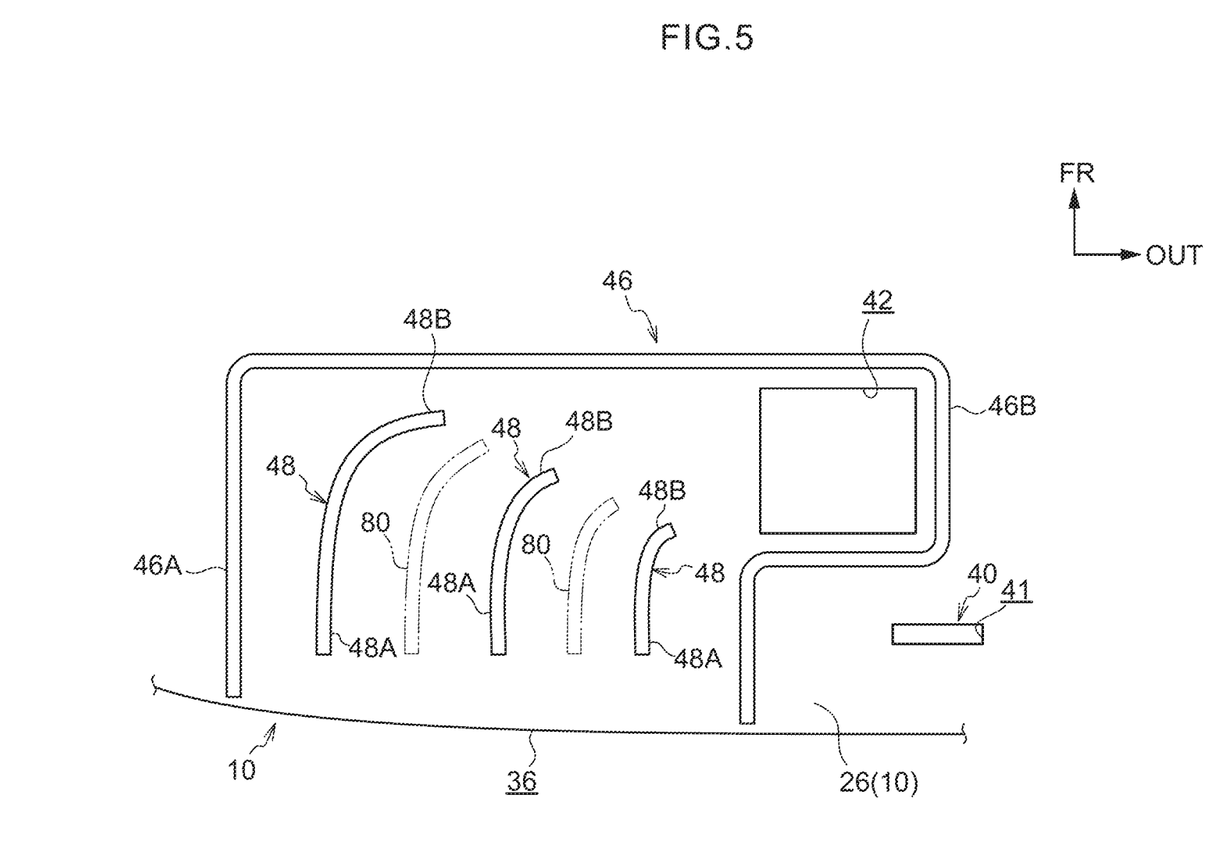
FIG. 5 is a plan view, corresponding to FIG. 4, showing an example modification of the instrument panel pertaining to the first embodiment.

Furthermore, in the first embodiment, the flow-directing plates 48 are integrally formed on the placement surface portion 26 of the lower panel portion 20, but the disclosure is not limited to this, and the flow-directing plates 48 may also be integrally formed on the lower surface portion 24A of the upper panel portion 24. As another method, flow-directing plates may also be integrally formed on both the lower panel portion 20 and the upper panel portion 24, For example, as shown in FIG. 5, flow-directing plates 80 disposed between the plural flow-directing plates 48 formed on the lower panel portion 20 may be integrally formed on the lower surface portion 24A of the upper panel portion 24. In FIG. 5 the disposition, in an attached state, of the flow-directing plates 80 formed on the upper panel portion 24 is indicated by long dashed double-short dashed lines.

Furthermore, in the first embodiment, the side wall portion 46 and the flow-directing plates 48 are integrally formed on the placement surface portion 26, but the disclosure is not limited to this, and the side wall portion and the flow-directing plates may also be configured separately from the placement surface portion.

What is claimed is:

1. An instrument panel structure, comprising:
   a lower panel portion that is provided with an air-conditioning device at an interior thereof, the lower panel portion having, in a vehicle upper portion thereof, a placement surface portion that extends in a vehicle width direction and a vehicle front-rear direction so as to project in a tabular shape in the vehicle front-rear direction, and having an open portion, for the air-conditioning device, that opens toward a side of the placement surface portion;
   an upper panel portion that covers the placement surface portion as seen from a vehicle upper side and that is placed on the placement surface portion; and
   a slit-shaped air outlet portion that is formed between the lower panel portion and the upper panel portion, that extends in the vehicle width direction while facing a seat side, and that communicates the open portion with a vehicle cabin; and wherein:
   a side wall portion having a shape of a frame, which surrounds the open portion and a pair of sides of the air outlet portion to form an open end corresponding to the air outlet portion as seen from the vehicle upper side, is provided between opposing surfaces of the placement surface portion and the upper panel portion, and
   a space that links the open portion and the air outlet portion is formed by the opposing surfaces of the placement surface portion and the upper panel portion and an inner surface of the side wall portion.

2. The instrument panel structure according to claim 1, wherein at least one of the placement surface portion or a lower surface portion of the upper panel portion is provided with a plurality of flow-directing plates at a portion positioned at an inner side of the side wall portion as seen from a vehicle vertical direction.

3. The instrument panel structure according to claim 2, wherein:
   the plurality of flow-directing plates is provided at the placement surface portion and one or more of the plurality of flow-directing plates is formed in a shape of a frame, and
   the placement surface portion is equipped with a plurality of anchor receiving portions, to which a plurality of anchoring portions provided at a peripheral edge of the upper panel portion can be anchored, and at least one of the plurality of anchor receiving portions is disposed inside a frame of the plurality of flow-directing plates at a vehicle front side of the air outlet portion.

4. The instrument panel structure according to claim 2, wherein each of the plurality of flow-directing plates is equipped with:
a linear portion that extends in the vehicle front-rear direction along the linear flow path portions, and
a curved portion that curves from a vehicle front end portion of the linear portion to one side in the vehicle width direction and toward the open portion.

5. The instrument panel structure according to claim 1, wherein the upper panel portion is detachable from the placement surface portion.

6. The instrument panel structure according to claim 1, wherein, in the placement surface portion, an air direction guide portion, which extends in a vehicle rearward direction and a vehicle upward direction as seen from the vehicle width direction, is formed at a seat-side peripheral edge of the placement surface portion and at a vehicle rear side of the air outlet portion.

7. The instrument panel structure according to claim 1, wherein the air outlet portion extends from one side in the vehicle width direction to a region facing a vehicle width direction center.

8. The instrument panel structure according to claim 1, wherein:
the air outlet portion is formed at a position at which it does not overlap with the open portion, for the air-conditioning device, as seen from the vehicle front-rear direction, and
the side wall portion is equipped with:
a delivery portion that projects in the vehicle width direction and surrounds a periphery of the open portion and
linear flow path portions, which are formed integrally with the delivery portion, extend in the vehicle front-rear direction from both sides of the air outlet portion, and supply, to the vehicle cabin, air-conditioned air that is supplied from the delivery portion.

9. An instrument panel structure, comprising:
a lower panel portion that is provided with an air-conditioning device at an interior thereof, the lower panel portion having, in a vehicle upper portion thereof, a placement surface portion that extends in a vehicle width direction and a vehicle front-rear direction, and having an open portion, for the air-conditioning device, that opens toward a side of the placement surface portion;
an upper panel portion that covers the placement surface portion as seen from a vehicle upper side and that is placed on the placement surface portion; and
a slit-shaped air outlet portion that is formed between the lower panel portion and the upper panel portion, that extends in the vehicle width direction while facing a seat side, and that communicates the open portion with a vehicle cabin, wherein:
a side wall portion, which surrounds the open portion and the air outlet portion as seen from a vehicle vertical direction, is provided between opposing surfaces of the placement surface portion and the upper panel portion,
a space that links the open portion and the air outlet portion is formed by the opposing surfaces of the placement surface portion and the upper panel portion and an inner surface of the side wall portion, at least one of the placement surface portion or a lower surface portion of the upper panel portion is provided with a plurality of flow-directing plates at a portion positioned at an inner side of the side wall portion as seen from the vehicle vertical direction,
the plurality of flow-directing plates is provided at the placement surface portion and one or more of the plurality of flow-directing plates is formed in a shape of a frame, and
the placement surface portion is equipped with a plurality of anchor receiving portions, to which a plurality of anchoring portions provided at a peripheral edge of the upper panel portion can be anchored, and at least one of the plurality of anchor receiving portions is disposed inside a frame of the plurality of flow-directing plates at a vehicle front side of the air outlet portion.

10. An instrument panel structure, comprising:
a lower panel portion that is provided with an air-conditioning device at an interior thereof, the lower panel portion having, in a vehicle upper portion thereof, a placement surface portion that extends in a vehicle width direction and a vehicle front-rear direction, and having an open portion, for the air-conditioning device, that opens toward a side of the placement surface portion;
an upper panel portion that covers the placement surface portion as seen from a vehicle upper side and that is placed on the placement surface portion; and
a slit-shaped air outlet portion that is formed between the lower panel portion and the upper panel portion, that extends in the vehicle width direction while facing a seat side, and that communicates the open portion with a vehicle cabin; and wherein:
a side wall portion, which surrounds the open portion and a pair of sides of the air outlet portion as seen from the vehicle upper side, is provided between opposing surfaces of the placement surface portion and the upper panel portion,
a space that links the open portion and the air outlet portion is formed by the opposing surfaces of the placement surface portion and the upper panel portion and an inner surface of the side wall portion,
wherein at least one of the placement surface portion or a lower surface portion of the upper panel portion is provided with a plurality of flow-directing plates at a portion positioned at an inner side of the side wall portion as seen from a vehicle vertical direction,
the plurality of flow-directing plates is provided at the placement surface portion and one or more of the plurality of flow-directing plates is formed in a shape of a frame, and
the placement surface portion is equipped with a plurality of anchor receiving portions, to which a plurality of anchoring portions provided at a peripheral edge of the upper panel portion can be anchored, and at least one of the plurality of anchor receiving portions is disposed inside a frame of the plurality of flow-directing plates at a vehicle front side of the air outlet portion.

11. The instrument panel structure according to claim 10, wherein the upper panel portion is detachable from the placement surface portion.

12. The instrument panel structure according to claim 10, wherein, in the placement surface portion, an air direction guide portion, which extends in a vehicle rearward direction and a vehicle upward direction as seen from the vehicle width direction, is formed at a seat-side peripheral edge of the placement surface portion and at a vehicle rear side of the air outlet portion.

13. The instrument panel structure according to claim 10, wherein the air outlet portion extends from one side in the vehicle width direction to a region facing a vehicle width direction center.

14. The instrument panel structure according to claim 10, wherein:
- the air outlet portion is formed at a position at which it does not overlap with the open portion, for the air-conditioning device, as seen from the vehicle front-rear direction, and
- the side wall portion is equipped with:
  - a delivery portion that projects in the vehicle width direction and surrounds a periphery of the open portion and
  - linear flow path portions, which are formed integrally with the delivery portion, extend in the vehicle front-rear direction from both sides of the air outlet portion, and supply, to the vehicle cabin, air-conditioned air that is supplied from the delivery portion.

15. The instrument panel structure according to claim 10, wherein each of the plurality of flow-directing plates is equipped with:
- a linear portion that extends in the vehicle front-rear direction along the linear flow path portions, and
- a curved portion that curves from a vehicle front end portion of the linear portion to one side in the vehicle width direction and toward the open portion.

* * * * *